(12) United States Patent
Hammond

(10) Patent No.: US 6,903,317 B2
(45) Date of Patent: Jun. 7, 2005

(54) INDUCTION HEATING SYSTEM HAVING ECCENTRIC LOCATOR

(76) Inventor: Michael R. Hammond, 3801 Casey Rd., Metamora, MI (US) 48455

( * ) Notice: Subject to any disclaimer, the term of this patent is extended or adjusted under 35 U.S.C. 154(b) by 12 days.

(21) Appl. No.: 10/606,811

(22) Filed: Jun. 25, 2003

(65) Prior Publication Data

US 2004/0069773 A1 Apr. 15, 2004

Related U.S. Application Data

(60) Provisional application No. 60/392,250, filed on Jun. 25, 2002.

(51) Int. Cl.[7] .................................................. H05B 6/10
(52) U.S. Cl. ....................................... 219/639; 219/652
(58) Field of Search ................................ 219/635–642, 219/647, 648, 652, 659–667, 672–677; 266/249, 252; 148/572

(56) References Cited

U.S. PATENT DOCUMENTS

| | | | |
|---|---|---|---|
| 3,737,613 A | * | 6/1973 | Gillock |
| 4,604,510 A | * | 8/1986 | Laughlin et al. |
| 4,728,761 A | * | 3/1988 | Mucha et al. |

* cited by examiner

Primary Examiner—Tu Hoang
(74) Attorney, Agent, or Firm—Warn, Hoffmann, Miller & LaLone, P.C.

(57) ABSTRACT

An induction heating system and method of using the same are described. The system includes a locator system that eccentrically positions the central axis of the internal central void of the work piece with respect to the central axis of the locator system. The locator system also includes a rotation system that allows the work piece to be eccentrically rotated during the heat-treating process. In this manner, the lobe and heel portions of a cammed surface are substantially equidistant from the internal surfaces of an inductor so as to ensure substantially uniform heating of the external surfaces of the work piece.

32 Claims, 1 Drawing Sheet

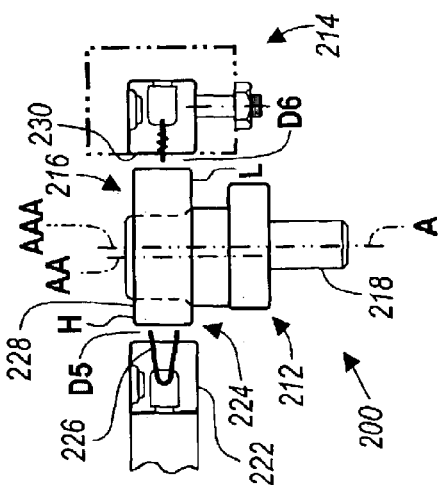
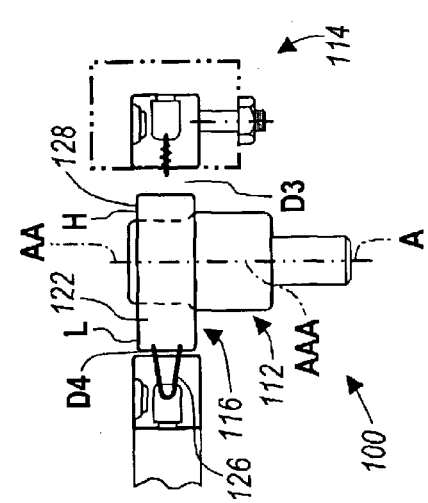
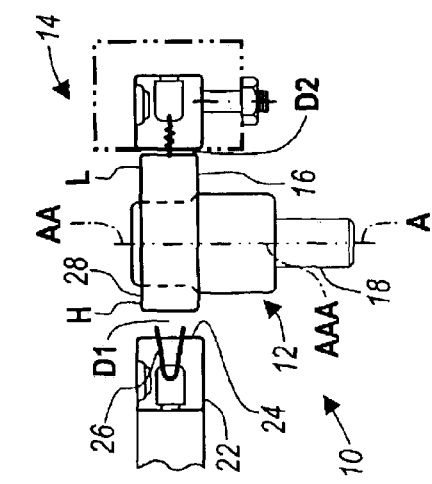
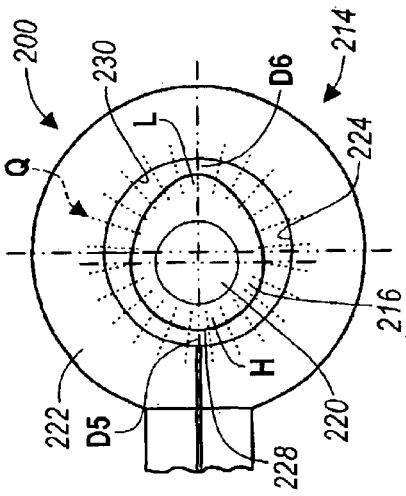
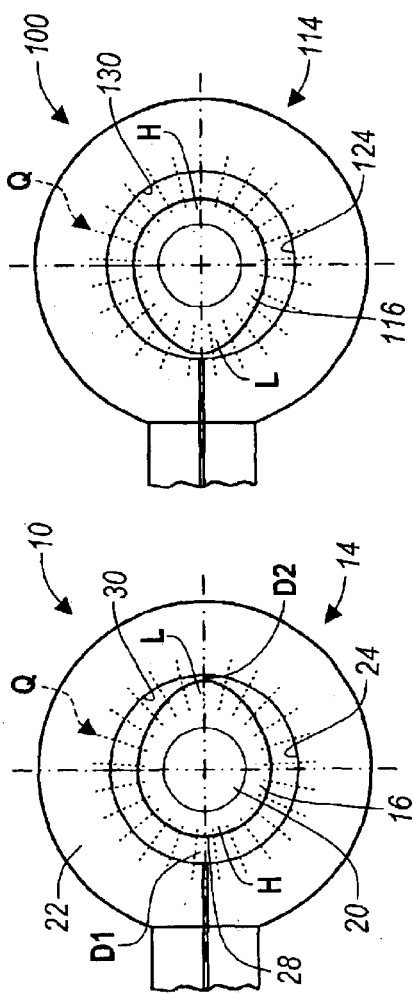

INDUCTION HEATING SYSTEM HAVING ECCENTRIC LOCATOR

CROSS-REFERENCE TO RELATED APPLICATION

The instant application claims priority to U.S. Provisional Patent Application Ser. No. 60/392,250, filed Jun. 25, 2002, the entire specification of which is expressly incorporated herein by reference.

FIELD OF THE INVENTION

The present invention relates to induction heating systems generally, and more particularly to an induction heating system and method of using the same, wherein the work piece is eccentrically rotated about the central axis of the locator system so as to achieve uniform heating of the work piece by the inductor system, especially those cammed work pieces possessing a lobe portion and a heel portion.

BACKGROUND OF THE INVENTION

Induction heating is a well-known surface hardening process that has been widely used by the metallurgical industry to heat treat metallic work pieces. Its generally superior controllability makes it an attractive alternative to previous surface hardening techniques.

Induction heating is typically achieved by passing a high frequency current through a suitably shaped inductor. For example, inductors have been designed to include a substantially circular internal void for the heating of work pieces having a substantially rounded or circular cross-section, such as cammed work pieces including cam members and the like. The inductor is then typically positioned in close proximity to the surface to be hardened. The rapid current reversal induces eddy currents in the surface causing it to heat above the hardening (e.g., austenitizing) temperature.

Austenitizing generally involves heating of the work piece above its transformation temperature and then quenching it in a salt bath or other quenching medium (e.g., oil, water, air, and/or the like) in order to extract the heat at a sufficiently high enough rate to prevent the formation of undesirable high-temperature-transformation qualities on its surface or in its microstructure.

Towards this end, the inductor is used to heat the work piece with a subsequent spray quench so as to achieve the rapid heating and cooling which results in hardening. This process is extremely versatile and can be used on a variety of metallic work pieces possessing different shapes and sizes.

With respect to work pieces that have a generally rounded or cammed cross-section, there has been some difficulty in uniformly heating the external surfaces thereof due, in part, to the irregular shapes of these cammed work pieces. Cammed work pieces typically have a lobe portion (having a substantially ovoid appearance) and a spaced and opposed heel portion (having a substantially circular appearance). When subjected to conventional induction heating processes, the lobe portion has a tendency to overheat, thus resulting in poor overall surface hardening results.

In an effort to overcome this problem, several approaches were attempted, none of which produced acceptable results.

With respect to FIGS. 1–2, an induction heating system 10 is shown including a locator system 12, an inductor system 14, and a work piece 16, in accordance with the prior art. The dashed lines indicate a quenching system Q for controlled cooling of the work piece 16.

The locator system 12 supports the work piece 16 during the heat-treating process. Additionally, the locator system 12 includes a rotation system 18 that can selectively rotate the work piece 16, if desired. The locator system 12 includes a central axis A.

In this system 10, the work piece 16, e.g., a cam member, includes a lobe portion L and a heal portion H. Formed along the central axis AA of the work piece 16 is an area defined as a void 20. It should be noted that the central axis AA is slightly offset from the geometric axis of the work piece 16. However, the central axis A of the locator system 12 substantially concentrically aligns with the central axis AA of the work piece 16.

The inductor system 14 includes an inductor 22. Formed along the central axis AAA of the inductor 22 is an area defined as a void 24. It should be noted that the central axis AAA is substantially aligned with the geometric axis of the inductor 22. Additionally, the central axis AAA of the void 24 of the inductor 22 substantially concentrically aligns with both the central axis A of the locator system 12 and the central axis AA of the void 20 of the work piece 16.

The inductor 22 typically includes an area known as a split region 26 (also referred to as a "fish-tail" region) where in conventional induction heating systems there is a distortion of the electromagnetic field due to a current cancellation phenomenon. As a result of this phenomenon, a soft spot or "necking" of the hardening pattern could appear in the heated work piece 16.

As can be clearly seen in FIGS. 1–2, in the initial fixtured position shown, the distance D1 between the external surface 28 of the heel portion H from the internal surface 30 of the inductor 22 is substantially greater than the distance D2 between the lobe portion L and the internal surface 30 of the inductor 22. Thus, even if the work piece 16 were to be rotated during the heat-treating process, there would most likely be uneven heating of the external surface of the work piece 16 possibly resulting in an uneven hardening pattern.

Another approach to this problem is shown in FIGS. 3–4. An alternate induction heating system 100 is shown, in accordance with the prior art. As with the induction heating system 10 shown in FIGS. 1–2, the system 100 includes a locator system 112, an inductor system 114, and a work piece 116. The dashed lines indicate a quenching system Q for controlled cooling of the work piece 116. However, there is no provision for rotating the work piece 116 relative to either the locator system 112 or the inductor system 114.

As with the previously described system 10, the central axes A, M, and AAA of the locator system 112, the void 120 of the work piece 116, and the void 122 of the inductor 222, respectively, are substantially concentrically aligned.

This system 110 relies on fixturing the work piece 116 is a stationary position on the locator system 112 (i.e., the work piece 116 does not rotate with respect to the inductor system 114), with the lobe portion L of the work piece 116 oriented towards the split region 126 of the inductor 122. The distance D3 between the external surface 128 of the heel portion H and the internal surface 130 of the inductor 122 is substantially greater than the distance D4 between the lobe portion L and the internal surface 130 of the inductor 122. However, because the lobe portion L is oriented towards the split region 126, it is highly likely that a necking effect will be observed, thus resulting in uneven hardening of the surface of the work piece 116, especially in the area of the lobe portion L.

Therefore, there exists a need for an apparatus and method of using the same that permits substantially uniform induction heating of a work piece, especially a metallic work piece having irregular and/or non-linear surface characteristics, such as cammed surfaces, including those cammed surfaces having a lobe portion and a heel portion, such as a cam member, to be used in conjunction with a camshaft, for example.

SUMMARY OF THE INVENTION

In accordance with the general teachings of the present invention, a new and improved induction heating system and method of using the same are provided.

The system of the present invention preferably provides an eccentric or "off-set" locator arrangement such that the central axis of an internal circular void of the work piece to be heated is located in a position that is slightly off-set from the central axis of a locator system used to retain and rotate the work piece during the heat-treating process. This feature is especially advantageous for heat-treating of work pieces having surfaces that are characterized as irregular or non-linear, e.g., cammed surfaces such as but not limited to cam members and the like, to be used in conjunction with camshafts, for example. By providing this feature, the various surfaces, especially the external surfaces, of the work piece are more properly located within the central circular void of the inductor so as to ensure more uniform heating of the work piece so as to prevent overheating one or more particular sections of the work piece.

The system of the present invention also preferably includes a system for rotating the work piece to be heated such that more uniform heating of the work piece can also be achieved. The rotation system preferably cooperates with the eccentric locator arrangement so as to allow the work piece to be eccentrically rotated about the central axis of the locator system.

In this manner, work pieces having a substantially irregular and/or non-linear surface profile or characteristic (e.g., cam members, camshafts, and the like) can be quickly, efficiently and uniformly heated without one or more particular sections becoming overheated during the induction heating process.

The present invention is especially advantageous in the induction heating of cammed surfaces having a lobe portion and a heel portion. In conventional heat induction systems, the lobe portion typically overheats due to the relative proximity of the lobe portion to the surface of the internal circular wall of the inductor. Conversely, the heel portion, being relatively further from the surface of the internal circular wall of the inductor does not typically overheat. However, the present invention overcomes this problem by eccentrically locating the work piece, in this case a cam member having a lobe portion and heel portion, such that the lobe portion and the heel portion are substantially equidistant from the surface of the internal circular wall of the inductor. The present invention also overcomes the aforementioned problem by eccentrically rotating the work piece relative to locator system so as to achieve uniform heating of the work piece.

In accordance with a first embodiment of the present invention, a system for induction heating a work piece is provided, wherein the work piece has a first central axis extending longitudinally therethrough, comprising: (1) an induction heating member having an outer surface and an inner surface, wherein the inner surface defines a void, wherein the void includes a second central axis extending longitudinally therethrough, wherein the first central axis is concentric to the second central axis; (2) a fixturing member selectively operable to fix the work piece thereon, wherein the fixturing member is operable to be at least partially received within the void, wherein the fixturing member includes a third central axis extending longitudinally therethrough, wherein the third central axis is eccentric to the first and second central axes; and (3) a rotation member selectively operable to rotate the fixturing member.

In accordance with a second embodiment of the present invention, a system for induction heating a work piece having an outer surface and an inner surface is provided, wherein the inner surface defines a first void, wherein the first void includes a first central axis extending longitudinally therethrough, comprising: (1) an induction heating member having an outer surface and an inner surface, wherein the inner surface defines a second void, wherein the second void includes a second central axis extending longitudinally therethrough, wherein the first central axis is concentric to the second central axis; (2) a fixturing member selectively operable to fix the work piece thereon, wherein the fixturing member is operable to be at least partially received within the second void, wherein the fixturing member includes a third central axis extending longitudinally therethrough, wherein the third central axis is eccentric to the first and second central axes; and (3) a rotation member selectively operable to rotate the fixturing member, wherein the outer surface of the work piece is operable to be substantially evenly heated by the induction heating member.

In accordance with a third embodiment of the present invention, a method for induction heating a work piece is provided, wherein the work piece has a first central axis extending longitudinally therethrough, comprising: (1) providing an induction heating member having an outer surface and an inner surface, wherein the inner surface defines a void, wherein the void includes a second central axis extending longitudinally therethrough, wherein the first central axis is concentric to the second central axis; (2) providing a fixturing member selectively operable to fix the work piece thereon, wherein the fixturing member is operable to be at least partially received within the void, wherein the fixturing member includes a third central axis extending longitudinally therethrough, wherein the third central axis is eccentric to the first and second central axes; and (3) providing a rotation member selectively operable to rotate the fixturing member.

In accordance with a fourth embodiment of the present invention, a method for induction heating a work piece is provided, wherein the work piece has a first central axis extending longitudinally therethrough, comprising: (1) providing an induction heating member having an area defining a void, wherein the void includes a second central axis extending longitudinally therethrough, wherein the first central axis is concentric to the second central axis; (2) providing a fixturing member selectively operable to fix the work piece thereon, wherein the fixturing member is operable to be at least partially received within the void, wherein the fixturing member includes a third central axis extending longitudinally therethrough, wherein the third central axis is eccentric to the first and second central axes; and (3) providing a rotation member selectively operable to rotate the fixturing member.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a partial top plan view of an induction heating system, in accordance with the prior art;

FIG. 2 is a partial side elevational view of the induction heating system depicted in FIG. 1, in accordance with the prior art;

FIG. 3 is a partial top plan view of an alternative induction heating system, in accordance with the prior art;

FIG. 4 is a partial side elevational view of the alternative induction heating system depicted in FIG. 3, in accordance with the prior art;

FIG. 5 is a partial top plan view of an induction heating system, in accordance with the general teachings of the present invention; and FIG. 6 is a partial side elevational view of the induction heating system depicted in FIG. 5, in accordance with the general teachings of the present invention.

The same reference numerals refer to the same parts throughout the various Figures.

DETAILED DESCRIPTION OF THE PREFERRED EMBODIMENTS

The following description of the preferred embodiment(s) is merely exemplary in nature and is in no way intended to limit the invention, its application, or uses.

The present invention, as generally shown in FIGS. 5–6, includes an induction heating system 200. The heating system 200 preferably includes a locator system 212 and an inductor system 214, in accordance with the general teachings of the present invention. By way of a non-limiting example, an illustrative work piece 216 is shown fixtured to the locator system 212 to illustrate an intended use of the heating system 200. The dashed lines indicate an optional quenching system Q for controlled cooling of the work piece 216.

The locator system 212 preferably supports the work piece 216 during the heat-treating process. Additionally, the locator system 212 preferably optionally includes a selectively operable rotation system 218 that can selectively rotate the work piece 216, if desired. The locator system 212 preferably includes a central axis A extending longitudinally therethrough.

In this system 210, the work piece 216, e.g., a cam member, preferably includes a lobe portion L and a heal portion H. The work piece 216 preferably includes a central axis AA extending longitudinally therethrough. If the work piece 216 includes an area defining a void 220 (e.g., formed by the inner surface thereof), then the central axis AA preferably extends longitudinally therethrough. It should be noted that the central axis AA is slightly offset from the geometric axis of the work piece 216. However, the central axis A of the locator system 212 is preferably slightly offset from the central axis AA of the void 220 of the work piece 216. In other words, the central axis AA of the void 220 of the work piece 216 is said to be preferably substantially eccentrically aligned with the central axis A of the locator system 212.

The degree of the offset is not thought to be critical to the success of the present invention, provided that the work piece 216 is able to freely rotate with respect to the inductor system 214 and that substantially uniform induction heating of the surface, especially the outer surface, of the work piece 216 can be achieved without any substantial occurrence of a necking effect in the heated work piece 216. In accordance with a preferred embodiment of the present invention, the central axis AA of the void 220 of the work piece 216 is offset by approximately 0.090 inches with respect to the central axis A of the locator system 212.

It should be appreciated that the locator system 212 can be comprised of various types of components and/or systems, provided that the desired and/or requisite degree of offset is achieved. By way of a non-limiting example, a servo operated holding chuck may also be used to secure and/or rotate the work piece 216.

The inductor system 214 preferably includes an inductor 222. The inductor 222 preferably includes an outer surface and an inner surface. The inductor 222 preferably includes a central axis AAA extending longitudinally therethrough. If the inductor 222 includes an area defining a void 224 (e.g., formed by the inner surface thereof), then the central axis AAA preferably extends longitudinally therethrough. It should be noted that the central axis AAA is substantially aligned with the geometric axis of the inductor 222. Additionally, the central axis AAA of the void 224 of the inductor 222 substantially concentrically aligns with the central axis A of the locator system 212, but not the central axis M of the void 220 of the work piece 216.

As with the previously discussed systems 10, and 110, the inductor 222 typically includes an area known as a split region 226.

As can be clearly seen in FIGS. 5–6, in the initial fixtured position shown, the distance D5 between the external surface 228 of the heel portion H from the internal surface 230 of the inductor 222 is substantially equal (i.e., equidistant) to the distance D6 between the lobe portion L and the internal surface 230 of the inductor 222. Thus, when the work piece 216 is rotated during the heating process, there would be substantially uniform and even heating of the external surface of the work piece 216, thus avoiding an uneven hardening pattern in the resulting heated work piece 216.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system for induction heating a work piece, wherein the work piece has a first central axis extending longitudinally therethrough, comprising:

an induction heating member having an outer surface and an inner surface, wherein the inner surface defines a void, wherein the void includes a second central axis extending longitudinally therethrough, wherein the first central axis is concentric to the second central axis, wherein the work piece includes an irregularly shaped outer surface, wherein the outer surface includes a first portion and a spaced and opposed second portion, wherein the outer surface of the work piece is operable to be received within the void of the induction heating member;

a fixturing member selectively operable to fix the work piece thereon, wherein the fixturing member is operable to be at least partially received within the void, wherein the fixturing member includes a third central axis extending longitudinally therethrough, wherein the third central axis is eccentric to the first and second central axes; and a rotation member selectively operable to rotate the fixturing member;

wherein the first and second portions of the work piece are substantially equidistant from the inner surface of the induction heating member during an induction heating operation.

2. The invention according to claim 1, wherein an outer surface of the work piece is operable to be substantially evenly heated by the induction heating member.

3. The invention according to claim 1, wherein an outer surface of the work piece is operable to be substantially evenly heated by the induction heating member.

4. The invention according to claim 1, wherein the work piece is a cam member.

5. The invention according to claim 1, wherein the work piece includes a heel portion and a spaced and opposed lobe portion.

6. The invention according to claim 1, further comprising a quenching system selectively operable to quench the work piece.

7. A system for induction heating a work piece having an outer surface and an inner surface, wherein the inner surface defines a first void, wherein the first void includes a first central axis extending longitudinally therethrough, comprising:

an induction heating member having an outer surface and an inner surface, wherein the inner surface defines a second void, wherein the second void includes a second central axis extending longitudinally therethrough, wherein the first central axis is concentric to the second central axis, wherein the outer surface of the work piece is irregularly shaped, wherein the outer surface includes a first portion and a spaced and opposed second portion, wherein the outer surface of the work piece is operable to be received within the void of the induction heating member;

a fixturing member selectively operable to fix the work piece thereon, wherein the fixturing member is operable to be at least partially received within the second void, wherein the fixturing member includes a third central axis extending longitudinally therethrough, wherein the third central axis is eccentric to the first and second central axes; and a rotation member selectively operable to rotate the fixturing member during an induction heating operation;

wherein the outer surface of the work piece is operable to be substantially evenly heated by the induction heating member;

wherein the first and second portions of the work piece are substantially equidistant from the inner surface of the induction heating member during the induction heating operation.

8. The invention according to claim 7, wherein the work piece is a cam member.

9. The invention according to claim 7, wherein the work piece includes a heel portion and a spaced and opposed lobe portion.

10. The invention according to claim 7, further comprising a quenching system selectively operable to quench the work piece.

11. A method for induction heating a work piece, wherein the work piece has a first central axis extending longitudinally therethrough, comprising:

providing an induction heating member having an outer surface and an inner surface, wherein the inner surface defines a void, wherein the void includes a second central axis extending longitudinally therethrough, wherein the first central axis is concentric to the second central axis, wherein the work piece includes an irregularly shaped outer surface, wherein the outer surface includes a first portion and a spaced and opposed second portion, wherein the outer surface of the work piece is operable to be received within the void of the induction heating member;

providing a fixturing member selectively operable to fix the work piece thereon, wherein the fixturing member is operable to be at least partially received within the void, wherein the fixturing member includes a third central axis extending longitudinally therethrough, wherein the third central axis is eccentric to the first and second central axes; and providing a rotation member selectively operable to rotate the fixturing member during an induction heating operation;

wherein the first and second portions of the work piece are substantially equidistant from the inner surface of the induction heating member during the induction heating operation.

12. The invention according to claim 11, wherein an outer surface of the work piece is operable to be substantially evenly heated by the induction heating member.

13. The invention according to claim 11, wherein an outer surface of the work piece is operable to be substantially evenly heated by the induction heating member.

14. The invention according to claim 11, wherein an outer surface of the work piece is operable to be substantially evenly heated by the induction heating member when the work piece is rotated.

15. The invention according to claim 11, wherein the work piece is a cam member.

16. The invention according to claim 11, wherein the work piece includes a heel portion and a spaced and opposed lobe portion.

17. The invention according to claim 11, further comprising providing a quenching system selectively operable to quench the work piece.

18. The invention according to claim 11, further comprising fixturing the work piece to the fixturing member.

19. The invention according to claim 11, further comprising rotating the work piece.

20. The invention according to claim 11, further comprising induction heating the work piece.

21. The invention according to claim 11, further comprising induction heating the work piece while the work piece is being rotated.

22. A method for induction heating a work piece, wherein the work piece has a first central axis extending longitudinally therethrough, comprising:

providing an induction heating member having an area defining a void, wherein the void includes a second central axis extending longitudinally therethrough, wherein the first central axis is concentric to the second central axis, wherein the work piece includes an irregularly shaped outer surface, wherein the outer surface includes a first portion and a spaced and opposed second portion, wherein the outer surface of the work piece is operable to be received within the void of the induction heating member;

providing a fixturing member selectively operable to fix the work piece thereon, wherein the fixturing member is operable to be at least partially received within the void, wherein the fixturing member includes a third central axis extending longitudinally therethrough, wherein the third central axis is eccentric to the first and second central axes; and providing a rotation member selectively operable to rotate the fixturing member during an induction heating operation;

wherein the first and second portions of the work piece are substantially equidistant from the inner surface of the induction heating member during the induction heating operation.

23. The invention according to claim 22, wherein an outer surface of the work piece is operable to be substantially evenly heated by the induction heating member.

24. The invention according to claim 22, wherein an outer surface of the work piece is operable to be substantially evenly heated by the induction heating member.

25. The invention according to claim 22, wherein an outer surface of the work piece is operable to be substantially evenly heated by the induction heating member when the work piece is rotated.

26. The invention according to claim 22, wherein the work piece is a cam member.

27. The invention according to claim 22, wherein the work piece includes a heel portion and a spaced and opposed lobe portion.

28. The invention according to claim 22, further comprising providing a quenching system selectively operable to quench the work piece.

29. The invention according to claim 22, further comprising fixturing the work piece to the fixturing member.

30. The invention according to claim 22, further comprising rotating the work piece.

31. The invention according to claim 22, further comprising induction heating the work piece.

32. The invention according to claim 22, further comprising induction heating the work piece while the work piece is being rotated.

* * * * *

UNITED STATES PATENT AND TRADEMARK OFFICE
CERTIFICATE OF CORRECTION

PATENT NO. : 6,903,317 B2
DATED : June 7, 2005
INVENTOR(S) : Micheal R. Hammond

It is certified that error appears in the above-identified patent and that said Letters Patent is hereby corrected as shown below:

Column 2,
Line 48, "A, M, and" should be -- A, AA, and --.

Column 5,
Line 49, "and a heal" should be -- and a heel --.

Column 6,
Line 26, "axis M of" should be -- axis AA of --.

Signed and Sealed this

Sixth Day of September, 2005

JON W. DUDAS
*Director of the United States Patent and Trademark Office*